United States Patent

[11] 3,608,881

[72] Inventors: Yordan Todorov Yordanov;
Georgi Ivanov Abrashev; Georgi Tenev
Georgiev; Velyo Dimitrov Zhekov; Yancho
Hristov Yanev; Ivan Georgiev Rossenov;
Velcho Angelov Prodanov; Yordan Todev
Roussev, all of Plovdiv, Bulgaria
[21] Appl. No.: 625,850
[22] Filed: Mar. 24, 1967
[45] Patented: Sept. 28, 1971
[73] Assignee: Kombinat Za Zvetni Metali, Dimiter Blagoev
Plovdiv, Bulgaria

[54] TUYERE APPARATUS FOR USING LIQUID FUEL IN THE FUMING PROCESS
6 Claims, 1 Drawing Fig.

[52] U.S. Cl. ........................................................ 266/41
[51] Int. Cl. ........................................................ C21b 7/16, C21c 5/48
[50] Field of Search ........................................... 266/41

[56] References Cited
UNITED STATES PATENTS
3,076,642  2/1963  Dhenein ..................... 266/41
3,395,910  8/1968  Holmes ....................... 266/41

Primary Examiner—J. Spencer Overholser
Assistant Examiner—John E. Roethel
Attorney—Waters, Roditi, Schwartz & Nissen ABSTRACT: A tuyere is provided for feeding liquid fuel, under a pressure of about 15 atmospheres, and air into a slag formed in nonferrous processes.

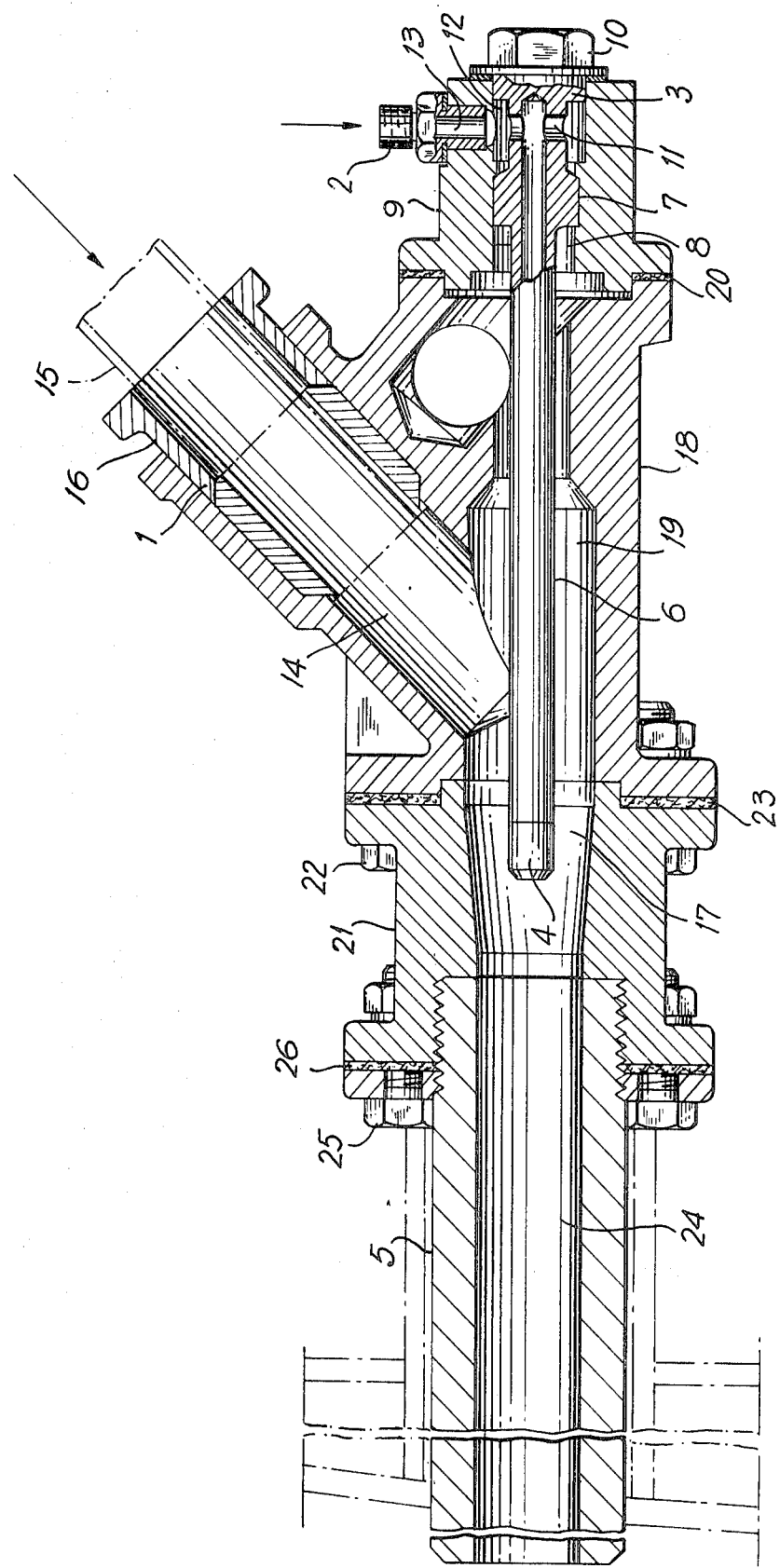

TUYERE APPARATUS FOR USING LIQUID FUEL IN THE FUMING PROCESS

DETAILED DESCRIPTION

The invention relates to methods of using liquid fuels for heating and as reducers in the fuming of liquid slags through a special tuyere.

There are known methods of fuming slags obtained in the production of nonferrous metals, which contain lead, zinc, tin, and other elements that are volatile in a reduction medium, wherein only powdered coal, prepared in accordance with a special technological diagram, is used as the fuel and reducer. However, solid fuel such as powdered coal has a number of disadvantages, most important of which are the following:

a. Additional expenses connected with obtaining it, which expenses amount nearly to the cost of the coal itself;

b. Its abrasiveness which necessitates the frequent replacement of channels, tuyeres, and so forth and in stoppages of the fuming installation;

c. Inaccuracy and difficulty of proportioning during the various periods of fuming;

d. The hazard of explosion involved; and e. High expenditure (20 to 25 percent of the weight of the slag).

It is also a known fact that experiments have been tried with respect to utilizing liquid fuel for the purpose of heating and of reduction in fuming processes, but these methods turned out to be of no practical significance.

A purpose of the invention is to make use of liquid fuel such as mazout, naphtha, and so forth, under particular conditions and by a special tuyere, as a fuel and reducer in the fuming of slags obtained in nonferrous metallurgy.

The liquid fuel is atomized by a nozzle acting under a pressure of over 15 atmospheres in a specially designed tuyere. The mixture obtained in the tuyere is blown through the layer of slag. The expenditure of air depends on the amount of the fuel which is determined by the slag and by the necessary reduction medium in the fuming furnace.

The use of liquid fuel for developing heat and for reduction in the method proposed by means of a special tuyere at the fuming process, has the following advantages over the utilization of coal in powdered form:

a. The possibility of precise determination and maintenance of the feed or supply necessary;

b. The possibility of automatic maintenance of the fuel-air ratio;

c. Low expenditure of fuel in relation to the slag (16 percent);

d. Simplified fuming installations leading to increase in the efficiency of the process;

e. Intensification of the fuming process;

f. Shorter stoppages needed for repairs and overhaul of the fuming installations.

DRAWING

The sole FIGURE is a cross-sectional view of a tuyere provided in accordance with the invention.

The drawing shows the special tuyere for the utilization of liquid fuel for the purposes of heating and reduction during the fuming process. From pipe union 2 the fuel comes at a pressure of 15 atmospheres and through stem 3 it enters nozzle 4 in which it is atomized. The air is fed to the special tuyere along stuffing box 1. The fuel mixture obtained is injected into the slag through a pipe 5 immersed in the slag bath.

The invention may be used in all fuming equipment processing lead, tin, and copper slag in enterprises of the nonferrous metallurgy.

With more particular reference to the tuyere of the invention, the nozzle 4 is formed on a stem 6 having an enlarged part 7 accommodated in a bore 8 in the part 9 to which pipe union 2 is connected. The stem 6 thus is supported cantilever fashion in main body 18 without external support thereby. The part 7 is locked in place by a nut 10 and is provided with a diametral passage 11 through the which the fuel enters from annular passage 12 after being received from bare 13 of pipe union 2. The bore 13 is perpendicular to nozzle 4.

Stuffing box 1 has an internal bore 14 through which the air passes after being received from hose 15 attached by coupling mechanism 16. Bore 14 is arranged at about a 45° angle to stem 6 and intersects the latter short of the nozzle 4 so that an annular passage 17 for the air is formed. Stuffing box 1 is, moreover, integral with the main body 18 whose bore 19 is coaxial with bore 8, there being provided a packing 20.

An extension 21 is connected to main body 18 by fastening means 22, a packing 23 being provided between the extension and main body. Annular chamber 17 has a slight taper in the direction of the nozzle. Pipe 5 has a bore 24 in extension in said annular chamber there being provided a locking mechanism 25 and packing 26.

What is claimed is:

1. A tuyere comprising a pipe, a nozzle adapted for receiving fuel and discharging the same into said pipe, a body through which said nozzle extends and between which an annular passage is confined means to supply air to said annular passage upstream of said nozzle and in immediate proximity therewith, and extension mounted on said body between said pipe and body and into which said nozzle extends, said annular passage tapering in said extension, a part mounted on said body and provided with a bore, a stem supporting said nozzle and including an enlarged part mounted in the latter said bore and a pipe union mounted perpendicularly on the first said part for delivering liquid fuel into the latter said bore, said stem having diametral openings which open into the latter said bore for the passage of fuel to said nozzle.

2. A tuyere as claimed in claim 1 wherein said means is provided with a straight bore for the passage of air, said straight bore opening into said annular passage at an angle of about 45°.

3. A tuyere as claimed in claim 2 wherein said means comprises a stuffing box containing said straight bore.

4. A tuyere as claimed in claim 1 wherein said stem is supported cantilever fashion in said body without external support thereby.

5. A tuyere as claimed in claim 1 wherein said pipe and extension have a combined length at least as great as the length of said stem 6. A tuyere as claimed in claim 1 comprising means detachably connecting said pipe to said extension and means detachably connecting said extension to said body.